Aug. 27, 1957 C. WILSON ET AL 2,804,265
CHECK WRITING AND BALANCE INDICATING DEVICE
Filed June 30, 1952 3 Sheets-Sheet 1
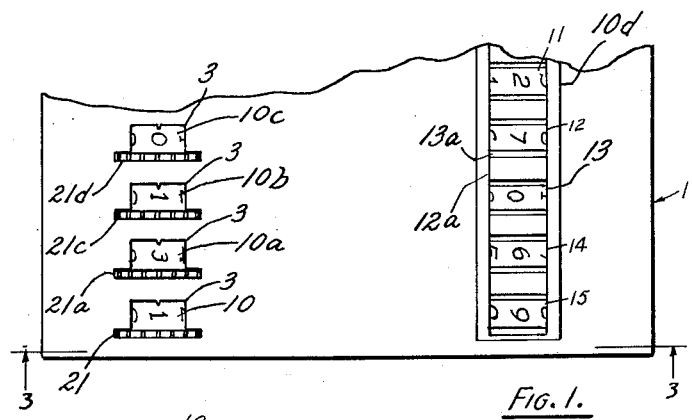
Fig. 1.
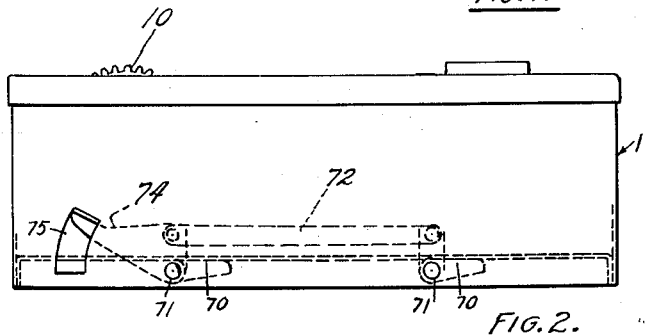
Fig. 2.
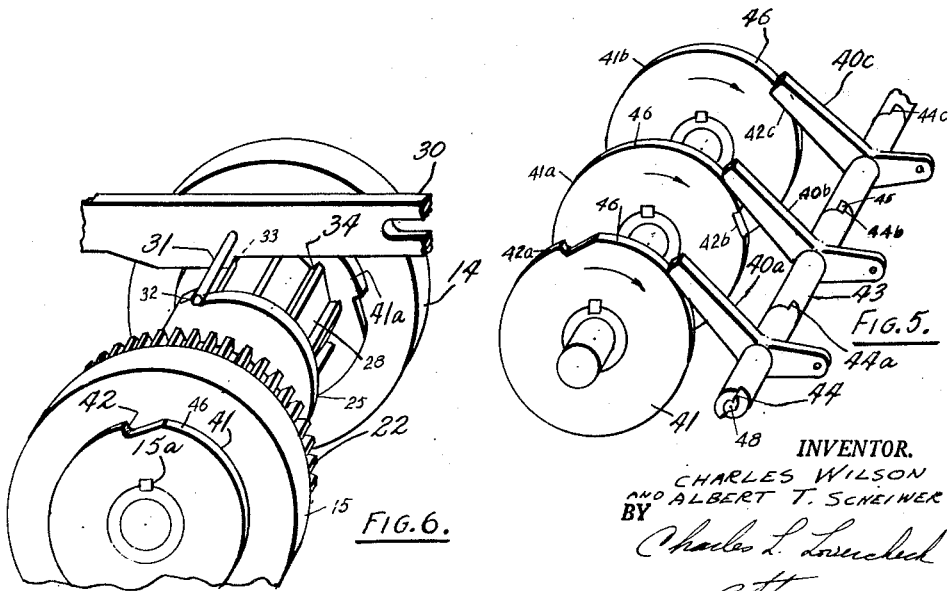
Fig. 5.
Fig. 6.
INVENTOR.
CHARLES WILSON
AND ALBERT T. SCHEIWER
BY
Charles L. Lovercheck
Attorney

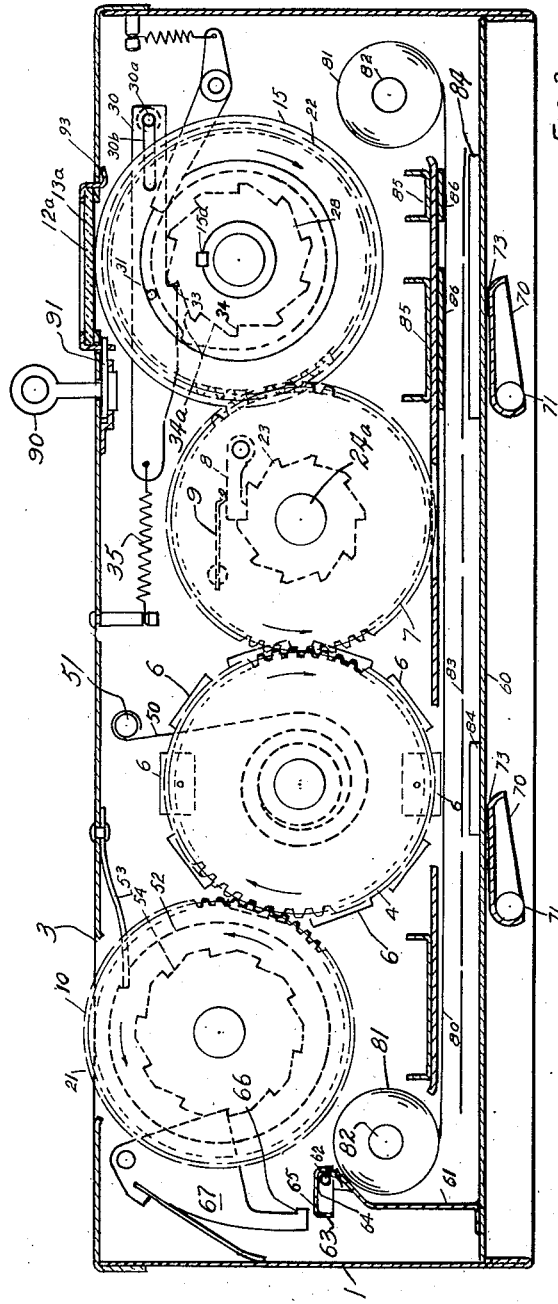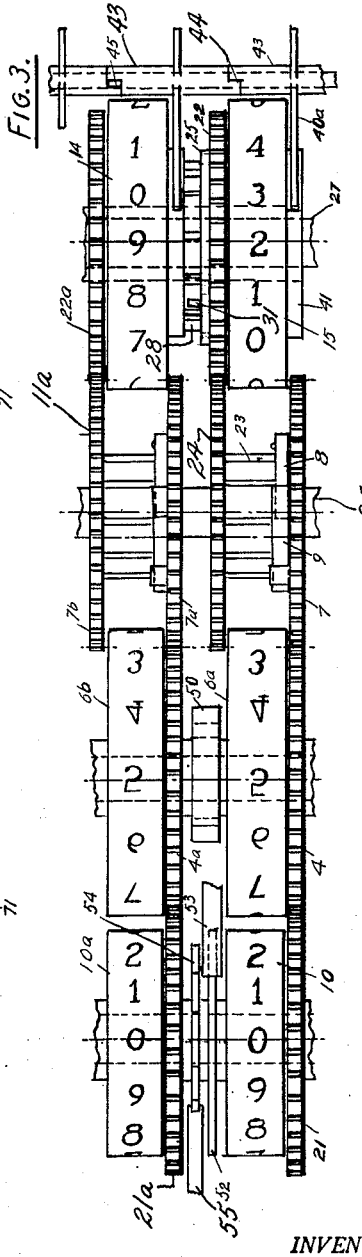

Aug. 27, 1957     C. WILSON ET AL     2,804,265
CHECK WRITING AND BALANCE INDICATING DEVICE
Filed June 30, 1952     3 Sheets-Sheet 3

INVENTOR.
CHARLES WILSON
AND ALBERT T. SCHEIWER
BY

United States Patent Office 2,804,265
Patented Aug. 27, 1957

2,804,265

CHECK WRITING AND BALANCE INDICATING DEVICE

Charles Wilson and Albert T. Scheiwer, Erie, Pa.; said Wilson assignor to said Scheiwer Application June 30, 1952, Serial No. 296,456

3 Claims. (Cl. 235—58)

This invention relates generally to a check writing apparatus and more particularly to devices for the writing of checks and orders to banks for the payment of money from a depositor's account to the bearer of the check.

It has become a universal custom for persons in business and private life to deposit money in banks in a checking account and to prepare orders addressed to the bank ordering the bank to pay certain amounts of money to the person named on the check. The bank usually supplies the depositor with blank checks whereon the name and address of the bank and the words "Pay to the order of" are printed. The depositor ordinarily fills in the date on the check with a pen, fills in the name of the party to whose order the check is to be paid, the amount of the check in numerals and also in words, and then signs the check. In making out checks in this manner, it is readily apparent that there is a danger of the maker of the check making an error in filling in the blanks of the check. There is also considerable danger that the maker of the check will make the check for a larger amount of money than he has in the bank, thereby causing embarrassment to himself and loss of time and trouble to the bank. The aforesaid method of making checks is also time consuming and laborious.

It is, accordingly, an object of this invention to overcome the above and other defects and hardships in prior methods and devices by providing a machine for preparing checks and particularly for preparing checks which order banks to pay certain amounts of money, which device will be simple in construction, economical in cost, economical in manufacture, and efficient in operation.

Another object of the invention is to provide a novel device which will show at a glance the amount of money which is remaining on deposit in a bank.

Another object of this invention is to provide a machine or mechanism wherein the bank can set the amount on deposit in the bank in the machine and each time a check is written by the machine, the amount of the check will be deducted from the amount on deposit in the bank and the net amount remaining in the bank will be indicated by the machine.

Another object of the invention is to provide a device for preparing checks and other documents which will positively identify the maker of the check or document.

A further object of this invention is to provide a device for preparing checks and other documents which is readily portable and convenient to use.

Other objects of this invention will become evident from the following detailed description, taken in conjunction with the accompanying drawings, in which Fig. 1 is a partial top view of the check writing machine of this invention showing certain parts in detail;

Fig. 2 is a side view of the machine to the invention;

Fig. 3 is a sectional view of the machine taken on line 3—3 of Fig. 1;

Fig. 4 is a top view of certain parts of the mechanism of the invention;

Figs. 5 and 6 are perspective views of certain parts of the mechanism, showing these parts in detail.

Figure 7:
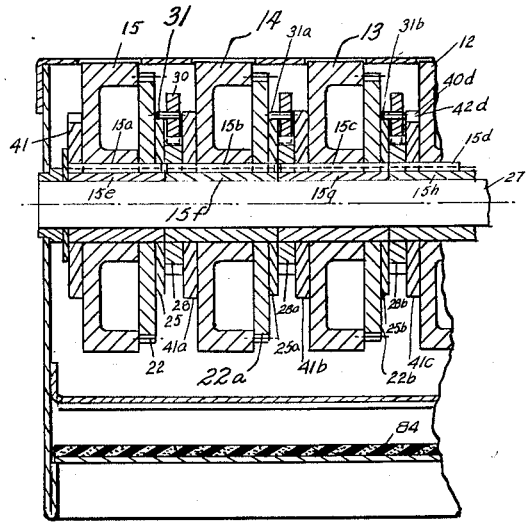
Figs. 7 and 8 are cross sectional views taken on Fig. 4.
Figure 8:
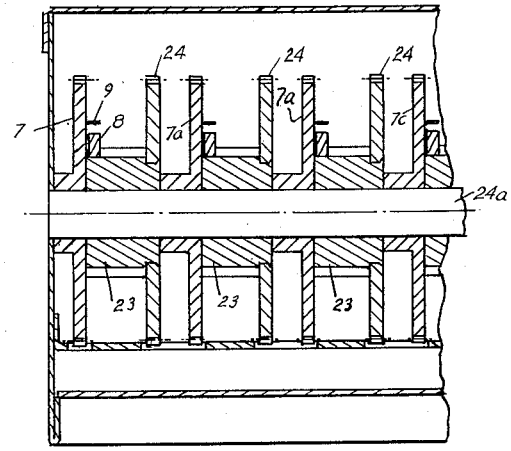

Referring now to the drawings, in Fig. 1 is shown a case 1 of the machine or recording mechanism wherein bank balance windows 10d are set in a plurality of apertures in the top of the case 1. Check wheels 10, 10a, 10b, and 10c are shown; however, the number of drive units could be increased and additional check wheels added to set up a figure of any desired number of digits. The check wheels are provided to set respective denominations of the digital amount of a check to be written. For example, if a check for $131.00 is to be written, "1" would be set on wheel 10b, "3" would be set on wheel 10a and "1" would be set on wheel 10.

The check writing machine is provided with a plurality of substantially identical units or gear trains and associated equipment. Each said gear train has the function of serving one digit of the amount. The first unit driven by the check wheel 10 comprises gear 21, gear 4, gear 7, gear 24, and gear 22. The second unit driven by the check wheel 10a comprises gear 21a, gear 4a, gear 7a, gear 11a, and gear 22a. Ratchet 54, check wheel 10, and ratchet member 52 are fixed together to rotate with gear 21. When "0" is set on the check setting wheel 10, pawl 53 will engage ratchet 52, preventing the check wheels from being rotated further in a clockwise direction and also serving as a stop for the check wheel 10 when it is being returned to "0" after a check has been written. Ratchet wheel 54 is engaged by pawl 67 to retain the check wheel at a setting which the operator sets on the check wheel 10 while the printing operation is taking place. Printing dies 6 are fixed to rotate with the gear 4. The gear 4 is in meshing engagement with gear 21 and gear 7. When the gear 21 is rotated in a counter-clockwise direction, the gear 4 will be rotated in a clockwise direction and a printing indicia 6 having thereon a numeral corresponding to the numeral shown at the top of the check wheel 10 will be in a position to print on a check blank 83. Handle 74 acting through cams lifts the platen 60 into engagement with the typewriter ribbon 80 to print the check. The gear 24 and ratchet 23 are fixed together and are freely rotatable on shaft 24a. The gear 7 drives gear 24 through ratchet 23 and pawl 8 in one direction. The pawl 8 is swingably attached to the gear 7 and is held into engagement with the ratchet 23 by spring 9.

The balance on deposit or gross amount in the bank is shown through the windows 10d on wheels 12, 13, 14, and 15. For example, if an amount of $7069.00 is to be deposited in the bank, the banker will unlock the machine with key 90 and set the wheels 12, 13, 14, and 15 so that the numerals "7," "0," "6," and "9" will appear in the windows 10d on the wheels 12, 13, 14, and 15, respectively. If the total bank balance has been exhausted, pawls 40a, 40b, and 40c will be resting in notches 42a, 42b, and 41c. If there is a residue balance in the bank, the pawls 40a to 40c will be riding on the peripheral surfaces of ratchets 41a and 41b. Assume that balance has been exhausted. The banker will then lift the pawl 40a out of the notch 42a and then rotate the wheel 15 in the direction of the arrow in Fig. 3 until the numeral "9" appears at the window 10d. During the rotation of the wheel 15, the gear 22 will drive the gear 24 and the ratchet 23 in the direction of the arrow shown in Fig. 3. The pawl 8 will slide over the ratchet teeth on the member 23 and the gear 7 will, therefore, not be moved. When the check wheel 15 is rotated as described, it will first advance the next higher denomination one digit through bar 30. The banker can then reset the balance wheel 14 in a similar manner and, also, all other balance wheels of higher denomination to obtain the desired balance setting.

If a check is written for $131.00, the wheels 10 to 10b will be rotated in a clockwise direction a sufficient amount to deduct $131.00 from $7069.00. When the wheels 10, 10a, and 10b are being returned to "0," it is necessary that the wheels 12, 13, 14, and 15 not be rotated with the wheels 10, 10a, and 10b or the amount would be reinstated to the deposit window 10d. Therefore, the ratchet 23 is provided as explained above. The gear 7 will therefore drive the member 24 in one direction only.

Ratchet 41, bank balance wheel 15, gear 22, and plate 25 are all fixed together on bushing 15b by means of key 15a and freely rotate on shaft 27. In like manner, wheel 13, ratchet 22b, plate 25b, ratchet 28a, and ratchet 41b are fixed on bushing 15g by means of key 15c and bushing 15g is freely rotatable on the shaft 27. Bank balance wheel 14, gear 22a, plate 25a, and ratchet 28 are fixed to a bushing 15f. The wheel 15 is driven through the gear train 21—4—8—23—24—22 when the check wheel 10 is being rotated counterclockwise to set a value thereon.

A mechanism is provided to prevent the depositor from overdrawing his account. This mechanism is made up of ratchets 41, 41a, and 41b having notches 42a, 42b, and 42c, respectively, to be engaged by pawls 40a, 40b, and 40c freely rotatable on a shaft 48 and interrelated through clearances 44, 44a, 44b, and 44c. When the amount on deposit is changed by the depositor by writing a check for $7050.00, the ratchets on the shaft 27 engaged by pawls 40a, 40b, and 40c in the 12 and 13 row will be locked so that another check for more than $19.00 cannot be written. This is accomplished by the ratchet 41c on the bank balance wheel 12 rotating until "0" appears in the window 10d on the wheel 12. At this point, the notch corresponding to the notch 42c will be in position to engage the pawl corresponding to the pawl 40c on the check wheel 7. This will prevent the bank balance wheel 12 from being rotated any more and it will lock the check wheel 10c to the bank balance wheel 12 through the gear.

When the pawl 40d engages the notch 42d in the ratchet 41c as described previously, a clearance will appear at 44c which will allow the pawl 40c to rotate counterclockwise on shaft 48 to engage the notch 42c and lock the gear train between the check wheel 10b and the bank balance wheel 13 against further movement.

If a check is then written for $19.00, the check wheels 10 and 10a will rotate through their respective gear trains, the bank balance wheels 14 and 15 to deduct $19.00 therefrom. This will bring the bank balance wheels 14 and 15 to "0" and the pawl 40b will drop into the notch 42b, providing a clearance at 44a to allow the pawl 40a to engage the notch 42a to lock the entire mechanism to prevent any other check from being written until the door 12a is opened by unlocking lock 91 by the banker by means of the key 90.

In order for a number to be transferred in the bank balance windows 10d, for example, from the check wheel 15 to the check wheel 14, when for example, a check for $76.00 is written and the balance is $7069.00 as shown, the check wheel 10a is set at "7" and the check wheel 10 is set at "6." It will be necessary to deduct the $76.00 from the $7069.00 shown on the bank balance wheels 12, 13, 14, and 15. It will be necessary for the machine to change the bank balance "7069" shown in Fig. 1 to "6993." This is accomplished through the mechanism shown in detail in Fig. 6. When the check wheel 10a is rotated to indicate an amount of "7," the numeral on the bank balance wheel 14 must change to "9." The numeral "7" on the wheel 12 must change to "6." When the check wheel 10 is rotated from "0" to "7," the bank balance wheel 14 will be rotated through "5," "4," "3," "2," "1," "0," "9," and "9" will remain on the bank balance wheel 14. When the bank balance wheel 14 is being rotated through "0" to "9," the cam 25 will rotate so that the notch 32 engages the pin 31 and slides the actuating bar 30 horizontally, causing the notch 33 to engage one of the teeth 34 to rotate the wheel 13 one digit; that is, from "0" to "9." When the bank balance wheel 14 has been rotated a spacing from "0" to "9," the next tooth on the ratchet 28 will raise the bar 30 to disengage the notch 33 from the ratchet 28 so that the bank balance wheel 13 will not be rotated any further. Since the bank balance wheel 13 was already set at "0," the pin 31b was already in engagement with the notch on plate 25b so that when the bank balance wheel 13 was moved from "0" to "9," the bank balance wheel 12 would be moved from "7" to "6." Rotating the check wheel 10 from "0" to "6" will rotate the bank balance wheel 15 from "9" to "3."

It will be apparent that the actuating bar 30 slides on notch 30b which engages pin 30a which is fixed to the frame of the check writing machine. When the notch 33 engages the ratchet 28 to slide the bar 30 on the pin 30a and after the bar 30 is released by the surface 34a of the following tooth pushing the notch 33 from engagement with the notch 34, the spring 35 slides the bar 30 back to its original position.

In the actual writing of a check, for example, if a check for $131.00 is to be written, the numerals "1," "3," and "1" are set on the check wheels 10a, 10b, and 10c, respectively. This will rotate the wheels 4, 4a, and 4b to bring the corresponding numerals "1," "3," and "1" to printing position on wheels 4, 4a, and 4b when the numbers "1," "3," and "1" are set on the check wheels 10a, 10b, and 10, respectively. This will rotate the member 4 to bring the corresponding numerals "1," "2," and "3" into printing position over the check blank 83. Then when the handle 74 is depressed, platen 60 is brought into engagement with the bottom of the check blank or record medium 83 and the numerals "1," "3," and "1" are printed on the check blank by the dies 6 operating through the ribbon 80. The ribbon 80 may be rolled on spools 81 which are pivoted on shafts 82. When the plate 60 is raised, the detent 61 is elevated to engage the pawl member 67 at corner 66 thereof to disengage the pawl from the ratchet 54 so that the spring 50 which is pivoted to fixed pin 51 rotates the gear 4 which rotates the gear 21 back to "0" so that the machine is ready to write another check. The check wheels 10b and 10a are likewise rotated to "0" when their respective detents are released. An identification mark 86 is provided on fixed bar 85 so that a positive identification mark, such as a thumb print of the depositor, is printed on every check. The platen of the mechanism is made up of the handle 74 which is connected to bell cranks 70. The handle 74 is fixedly pivoted on 71 and the arm of the handle 74 along with the bell cranks 70 coact with the platen to elevate it into printing engagement with the bottom of the check 83. The two bell cranks 70 are operatively connected to each other by means of links 72.

Although a particular embodiment of the invention has been described, it will be apparent that various changes may be made in the details of construction without departing from the scope of the appended claims.

What we claim is:

1. A check writing machine having a frame, a first, a second, a third, and a fourth shaft disposed on said frame in fixed spaced parallel relation to each other, a plurality of gears concentrically disposed on said shafts, each said gear on one said shaft meshing with a gear on another shaft, each said gear being in driving relation with said other gears, a first wheel on said first shaft attached to said gear thereon, said first wheel having numerals on the peripheral surface thereof, a second wheel on said second shaft having a plurality of numeral printing indicia on the periphery thereof concentrically disposed on said second shaft and attached to said second gear thereon, a spring coiled around said second shaft, said first wheel being biased toward a predetermined position by said spring, said spring being fixed at one end to said machine and attached at its other end to said second gear and disposed around said second shaft, a ratchet attached to said first wheel and concentric therewith, a platen on said machine actuatable to lift a check adapted to be printed into engagement with the indicia on said second wheel, a pawl on said machine holding said ratchet against the force of said spring while said check is being printed, said platen having means thereon to engage said pawl to release said ratchet when said platen is raised, allowing said spring to return said first wheel and said second wheel to said predetermined position, a balance indicating wheel, and means to drive said balance indicating wheel from said first wheel, said means to drive said balance indicating wheel including said gears on said third and fourth shafts.

2. The machine recited in claim 1 wherein said means to drive said balance indicating wheel further comprises a ratchet wheel fixed to said balance wheel having a notch therein, and a pawl is disposed on a frame adapted to lock said balance wheel when said balance wheel is rotated to a zero position.

3. The machine recited in claim 2 wherein the gears on said fourth shaft have a device for selectively locking said wheels to prevent only a predetermined amount of rotation thereof, each wheel being provided with a notch, a pawl means to engage each of said notches, said pawl means comprising a plurality of pawls rotatable on a shaft, and means on each pawl to prevent an adjacent pawl from engaging a notch until the first pawl has engaged a notch.

References Cited in the file of this patent

UNITED STATES PATENTS

| | | |
|---|---|---|
| 268,135 | Shattuck et al. | Nov. 28, 1882 |
| 657,266 | Dennis | Sept. 4, 1900 |
| 1,211,580 | Hehle | Jan. 9, 1917 |
| 1,397,559 | Stimson | Nov. 22, 1921 |
| 1,925,743 | Beall | Sept. 5, 1933 |
| 1,983,587 | Abel | Dec. 11, 1934 |
| 1,989,805 | Imber et al. | Feb. 5, 1935 |
| 2,423,991 | Mumma | July 15, 1947 |
| 2,596,370 | Bush | May 13, 1952 |